P. FARB.
AUTOMATIC STOP.
APPLICATION FILED MAY 31, 1918.

1,350,796.

Patented Aug. 24, 1920.

UNITED STATES PATENT OFFICE.

PINCUS FARB, OF SAGINAW, MICHIGAN, ASSIGNOR TO SONORA PHONOGRAPH CORPORATION, A CORPORATION OF NEW YORK.

AUTOMATIC STOP.

1,350,796.  Specification of Letters Patent.  Patented Aug. 24, 1920.

Application filed May 31, 1918. Serial No. 237,464.

*To all whom it may concern:*

Be it known that I, PINCUS FARB, a citizen of the United States, and a resident of the city of Saginaw, county of Saginaw, and State of Michigan, have invented a new and useful Improvement in Automatic Stops, of which the following is a specification.

My invention relates to disk record talking machines, and has for its object the production of an efficient device which will be self contained, which will automatically stop the operation of the mechanism when desired, and which may be placed in position by unskilled persons.

A further object of the invention is the provision of an automatic stop of the character described, simple in construction, neat and attractive in appearance, thoroughly reliable and efficient in its purpose, and economical to manufacture.

With these and other objects in view to be more fully set forth hereinafter, the invention consists in the novel construction, combination of elements, and arrangement of parts which will be exemplified in the construction hereinafter described in the specification and illustrated in the accompanying drawings considered together or separately.

The invention will be first described in connection with the accompanying drawings, illustrating one embodiment of my invention, wherein similar reference characters are used to designate corresponding parts throughout the several views, and then more specifically defined and indicated in the appended claims.

In the drawings,—

Figure 1:
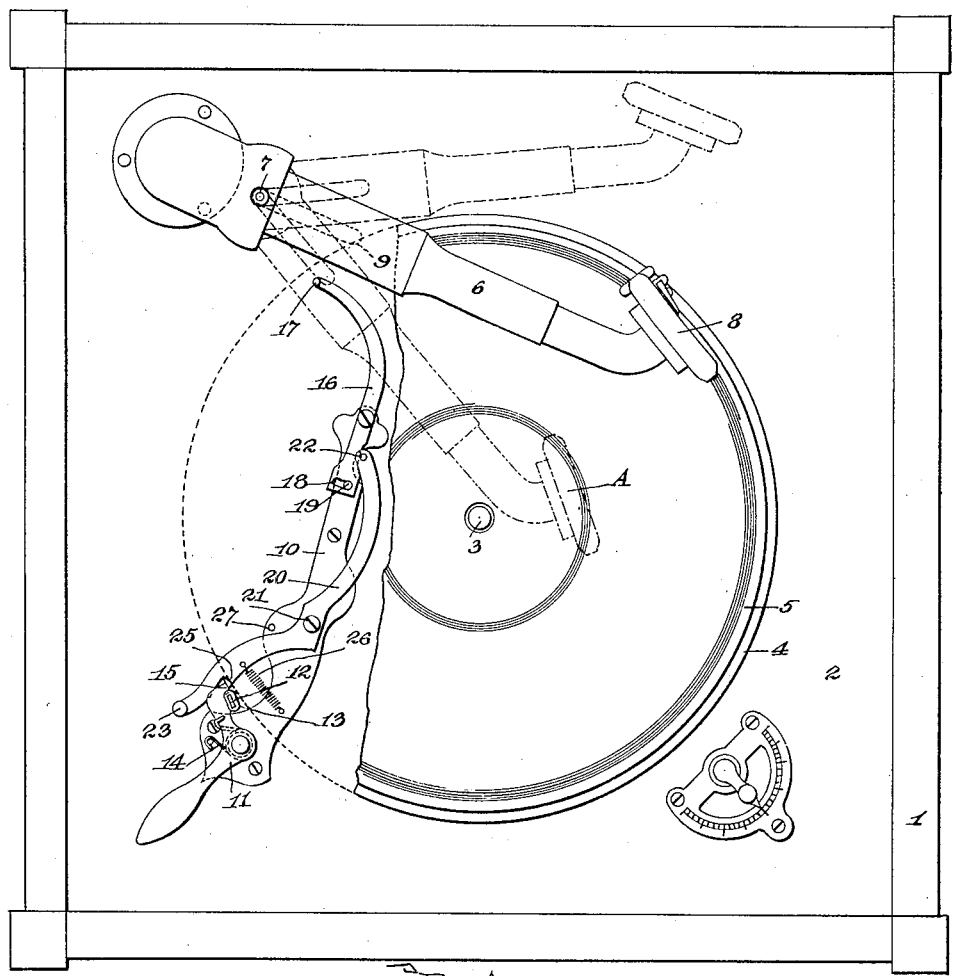
Figure 1 is a plan view of a talking machine embodying my invention, the turn-table and record disk being partly broken away.
Figure 2:
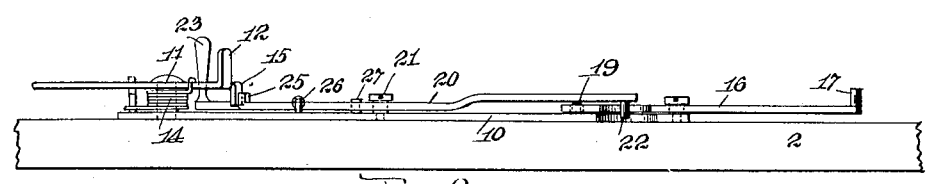
Fig. 2 is a side elevation of the device on an enlarged scale.

In carrying out my invention, I provide a cabinet 1 of any desired type. The cabinet is provided with a motor board 2 to the under side of which a motor (not shown) is attached. The turn-table spindle 3 of the motor extends through the motor board and carries a turn-table 4 on which rests a record disk 5.

A tone-arm 6 is secured to the motor board and communicates with an amplifier (not shown) below the motor board. The tone-arm is pivoted at 7 and carries a sound-box 8 at its free end. A movable finger 9 is carried by the tone-arm and is located on a plane below the turn-table.

Screwed or otherwise secured to the motor board, and partly beneath the turn-table is a base plate 10. One end of the base plate projects beyond the periphery of the turn-table, and has pivoted thereto a bell crank lever 11. One end of the lever is formed into a handle and the other carries an upwardly extending finger 12 on which is formed a brake shoe 13 adapted to coöperate with the periphery of the turn-table. A spring 14 tends to engage the brake shoe with the turn-table and prevent rotation of the latter and of the motor. The bell crank is provided with a downwardly extending lug 15 for a purpose to be hereinafter specified.

To the inner end of the base plate is pivoted a curved extension arm 16, an end of which carries a pin or projection 17 adapted to be engaged by the movable finger 9 which is operated by the travel of the tone-arm. The opposite end of the arm 16 is provided with a slot 18 with which engages a pin 19 projecting from the base plate.

A double curved lever 20 is pivoted between its ends at 21 on the base plate. One end of the lever carries a downwardly projecting pin 22 which engages the arm 16 between the slot 18 and the pivot of said arm, the base plate being cut away to allow for movement of the pin 22. The opposite end of the lever 20 extends beyond the turn-table and is provided with a handle 23, and near the handle the lever carries a dog or upward projecting member 25 adapted to coöperate with the lug 15 to hold the brake shoe out of contact with the turn-table. A spring 26 anchored to the base plate and attached to the lever 20 tends to normally hold the pin 22 in engagement with the arm 16, and the latter in the position shown in Fig. 1. A stop 27 limits the movement of the lever 20 against the tension of the spring 26.

The operation is as follows:

The parts being in the position shown in Fig. 1, the brake shoe 13 is released from or in disengagement with the turn-table, and the motor will operate. The tone-arm being in the position shown in full lines, the rotation of the turn-table will feed the sound-box and tone-arm across the turntable toward the center thereof. The movable finger 9 which is attached to the tone-arm, will be moved with the tone-arm. When the sound-box reaches the position A, its stylus will be in the last turn of the record groove. The finger 9 will engage the pin 17 and swing the arm 16 on its pivot. The arm 16 will engage the pin 22 and swing the lever 20 on the pivot 21. Such movement will release the dog or upward projecting member 25 from engagement with the lug 15, and the spring 14 which will move the bell crank and apply the brake to the periphery of the turn-table.

When it is desired to start the motor, the handle of the bell crank is swung to release the brake, and the lug 15 will engage behind the dog 25 and secure the brake shoe in inoperative position.

When it is desired to stop the motor before the stylus reaches the end of the record groove, the handle 23 may be employed to swing the lever 20, to release the lug 15 from the dog 25, and permit the spring 14 to set the brake.

In accordance with the provisions of the patent statute, I have described the principle of my invention together with the apparatus which I now consider to represent the best embodiment thereof, but I desire it understood that my invention is not confined to the particular form of apparatus herein shown and described, and, therefore, I claim broadly the right to employ all equivalent instrumentalities coming within the scope of the appended claims, and by means of which objects of my invention are attained, and the new results accomplished, as herein set forth, as it is obvious that the particular embodiment herein shown and described is only one of many that can be employed to attain these objects and accomplish these results.

Having now described my invention, what I claim as new and desire to secure by Letters Patent is:

1. A device of the character described, comprising a turntable, a pivoted tone-arm, a pivoted member in the path of the tone-arm and adapted to be engaged thereby, a pivoted brake, means for normally applying the brake to a moving part, a lever pivoted between the brake and said pivoted member and loosely engaging said pivoted member at one end and its other end projecting beyond the turntable, means on said lever for engaging the brake for holding the brake away from the moving part and adapted to be disengaged therefrom by the engagement of the tone-arm with the pivoted member to automatically release and apply the brake, and means on the projecting end of the brake-holding lever for manually rocking the brake-holding lever independently of the pivoted member to release the brake and permit the automatic movement thereof to apply the brake at any desired time.

2. A device of the character described, comprising a turntable, a pivoted tone-arm, a pivoted member in the path of the tone-arm and adapted to be engaged thereby, a pivoted brake, a spring for normally applying the brake to a moving part, an independently spring-actuated lever pivoted between the brake and said pivoted member and loosely engaging said pivoted member at one end and its other end projecting beyond the turntable, means on said lever for engaging the brake for holding the brake away from the moving part and adapted to be disengaged therefrom by the engagement of the tone-arm with the pivoted member, to automatically release and apply the brake, and means on the projecting end of the brake-holding lever for manually rocking the brake-holding lever independently of the pivoted member to release the brake and permit the automatic movement thereof to apply the brake at any desired time.

3. A device of the character described, comprising a base plate, a bell crank lever pivoted to the plate, a spring for moving the bell crank in one direction, a brake shoe carried by the bell crank and adapted to engage a moving part, a lug carried by the bell crank, a dog adapted to engage the lug to lock the bell crank against the tension of the spring, a lever carrying the dog, said lever being pivoted to the base plate, a spring attached to the lever and to the base plate, an arm pivoted to the base plate, said arm engaging a pin carried by the lever, whereby movement of the arm in one direction will move the lever to release the brake, a pin carried by the base plate, there being a slot in the arm engaging the pin, whereby the movement of the arm will be limited, a pin on the arm, a pivoted tone-arm, a finger carried by the tone-arm, said finger being adapted to engage the pin on the arm to rock the latter, whereby the lever will be rocked and the brake released, and means for manually rocking the lever.

4. A device of the character described, comprising a base plate, a bell crank lever pivoted to the plate, a spring for moving the bell crank in one direction, a brake shoe carried by the bell crank and adapted to engage a moving part, a lug carried by the bell crank, a dog adapted to engage the lug to lock the bell crank against the tension of the spring, a lever carrying the dog, said lever being pivoted to the base plate, a spring attached to the lever and to the base plate, an arm pivoted to the base plate, said arm engaging a pin carried by the lever, whereby movement of the arm in one direction will move the lever to release the brake, a pin carried by the base plate, there being a slot in the arm engaging the pin, whereby the movement of the arm will be limited, a pin on the arm, a pivoted tone-arm, a finger carried by the tone-arm, said finger being adapted to engage the pin on the arm to rock the latter, whereby the lever will be rocked and the brake released.

5. A device of the character described, comprising a turntable, a pivoted tone-arm, a pivoted member in the path of movement of the tone-arm and adapted to be engaged thereby, a pivoted brake lever having an upwardly projecting brake-shoe and a downwardly projecting lug at one end, means for normally applying the brake to a moving part, a lever pivoted between said pivoted member and said brake and loosely engaging said pivoted member at one end and projecting beyond the turntable at its other end, a lug on said lever adapted to engage the downwardly projecting lug on the brake to hold the brake away from the moving part and adapted to be disengaged therefrom by the engagement of the tone-arm with the pivoted member, to automatically release and apply the brake, and means on the projecting end of the brake-holding lever for manually rocking the brake-holding lever independently of the pivoted member to release the brake and permit the automatic movement thereof to apply the brake at any desired time.

6. A device of the character described, comprising a stationary member, a pivoted bell crank lever, a spring for moving the bell crank in one direction, a brake shoe carried by the bell crank and adapted to engage a moving part, a lug carried by the bell crank, a dog adapted to engage the lug to lock the bell crank against the tension of the spring, a lever carrying the dog, a spring attached to the lever, a pivoted arm, said arm engaging a pin carried by the lever, whereby movement of the arm in one direction will move the lever to release the brake, a stationary pin, there being a slot in the arm engaging the pin, whereby the movement of the arm will be limited, a pin on the arm, a pivoted tone-arm, a movable finger carried by the tone-arm, said finger being adapted to engage the pin on the arm to rock the latter, whereby the lever will be rocked and the brake released.

7. A device of the character described, comprising a stationary member, a pivoted bell crank lever, a spring for moving the bell crank in one direction, a brake shoe carried by the bell crank and adapted to engage a moving part, a lug carried by the bell crank, a dog adapted to engage the lug to lock the bell crank against the tension of the spring, a lever carrying the dog, a spring attached to the lever, a pivoted arm, said arm engaging a pin carried by the lever, whereby movement of the arm in one direction will move the lever to release the brake, a stationary pin, there being a slot in the arm engaging the pin, whereby the movement of the arm will be limited, a pin on the arm, a pivoted tone-arm, a movable finger carried by the tone-arm, said finger being adapted to engage the pin on the arm to rock the latter, whereby the lever will be rocked and the brake released, and means for manually rocking the lever.

This specification signed and witnessed this 7th day of May, 1918.

PINCUS FARB.

Witnesses:
JOHN L. LOTSCH,
M. JONES.